United States Patent
Mozingo et al.

[19]

[11] Patent Number: 6,085,609

[45] Date of Patent: *Jul. 11, 2000

[54] REPLACING TRANSMISSION OF RIGHT DRIVE VEHICLE WITH TRANSMISSION DESIGNED FOR LEFT DRIVE VEHICLE, AND ASSOCIATED CHANGE-OVER LINKAGE

[75] Inventors: Jerry R. Mozingo, Pikeville; Christopher S. Smith; William J. Smith, both of Goldsboro, all of N.C.

[73] Assignee: Jennings Transmission Service of Goldsboro, Inc., Goldsboro, N.C.

[*] Notice: This patent issued on a continued prosecution application filed under 37 CFR 1.53(d), and is subject to the twenty year patent term provisions of 35 U.S.C. 154(a)(2).

[21] Appl. No.: 09/032,960

[22] Filed: Mar. 2, 1998

[51] Int. Cl.⁷ ..................................................... F16H 59/02

[52] U.S. Cl. ..................... 74/473.3; 74/473.31; 29/401.1; 180/336

[58] Field of Search .............................. 74/473.3, 473.31; 180/336; 29/401.1

[56] References Cited

U.S. PATENT DOCUMENTS

| | | |
|---|---|---|
| 4,091,688 | 5/1978 | Huffman . |
| 4,304,317 | 12/1981 | Vanzant . |
| 4,523,655 | 6/1985 | Keenan . |
| 4,630,702 | 12/1986 | Irimajiri et al. ..................... 180/336 X |
| 5,623,852 | 4/1997 | Tischer . |
| 5,625,289 | 4/1997 | Daetz . |
| 5,626,212 | 5/1997 | Ersoy . |
| 5,638,720 | 6/1997 | Weinhart . |
| 5,651,293 | 7/1997 | Ebenstein . |
| 5,660,079 | 8/1997 | Friedich . |
| 5,660,080 | 8/1997 | Rector . |
| 5,661,999 | 9/1997 | Carone . |
| 5,662,005 | 9/1997 | Garman . |
| 5,666,855 | 9/1997 | Ebenstein . |

*Primary Examiner*—Allan D. Herrmann
*Attorney, Agent, or Firm*—Richard S. Faust

[57] ABSTRACT

An inadequate original equipment transmission in a right hand drive vehicle, for example a postal vehicle, is replaced with a more suitable transmission designed for a left hand drive vehicle. A right-to-left change-over linkage connects the shift rod emanating from the driver's gear selector lever to the shift lever on the left side of the replacement transmission. A kit containing necessary parts for replacing the transmission is disclosed. Also disclosed is a step-by-step operational procedure for carrying out the transmission replacement.

12 Claims, 7 Drawing Sheets

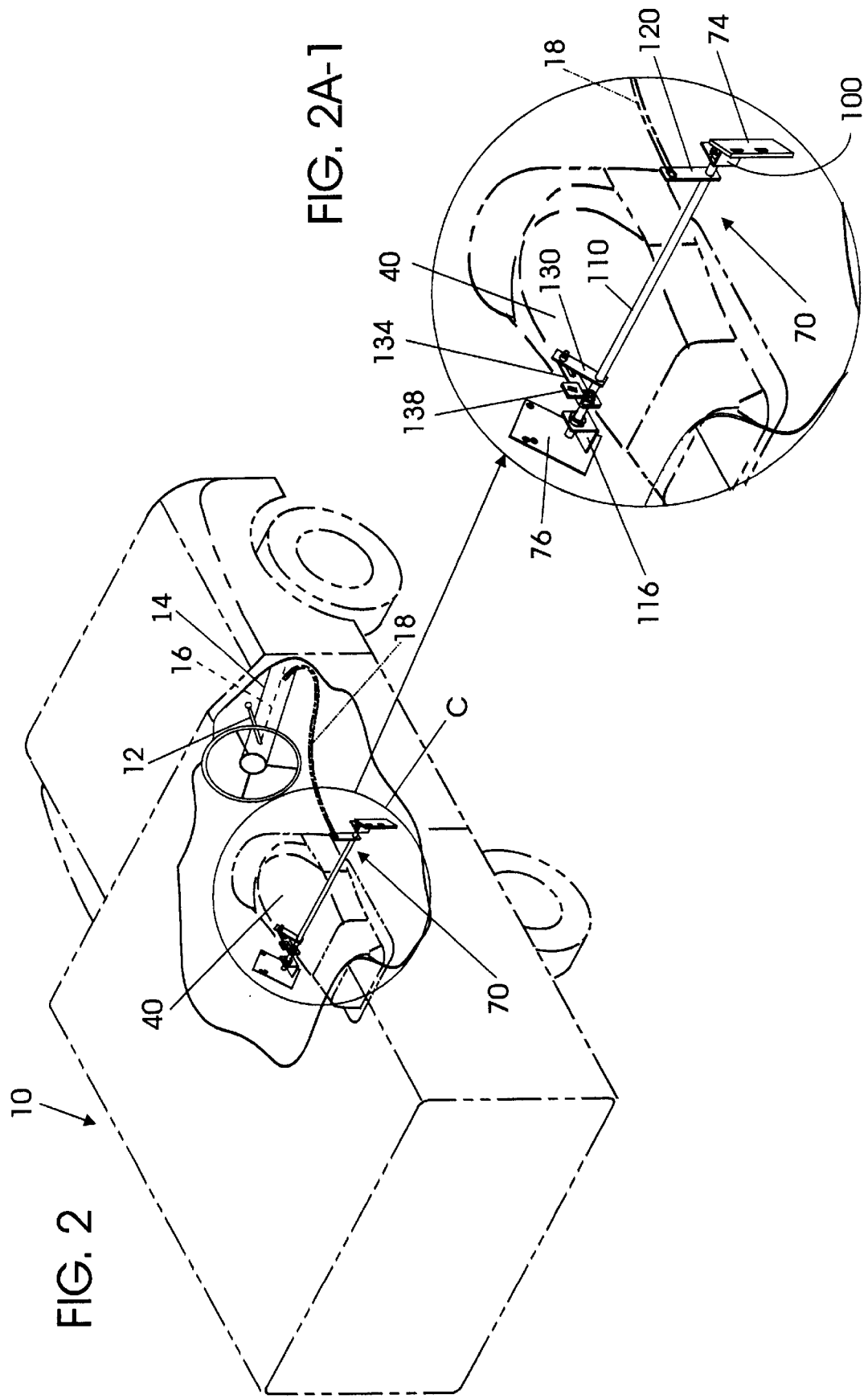

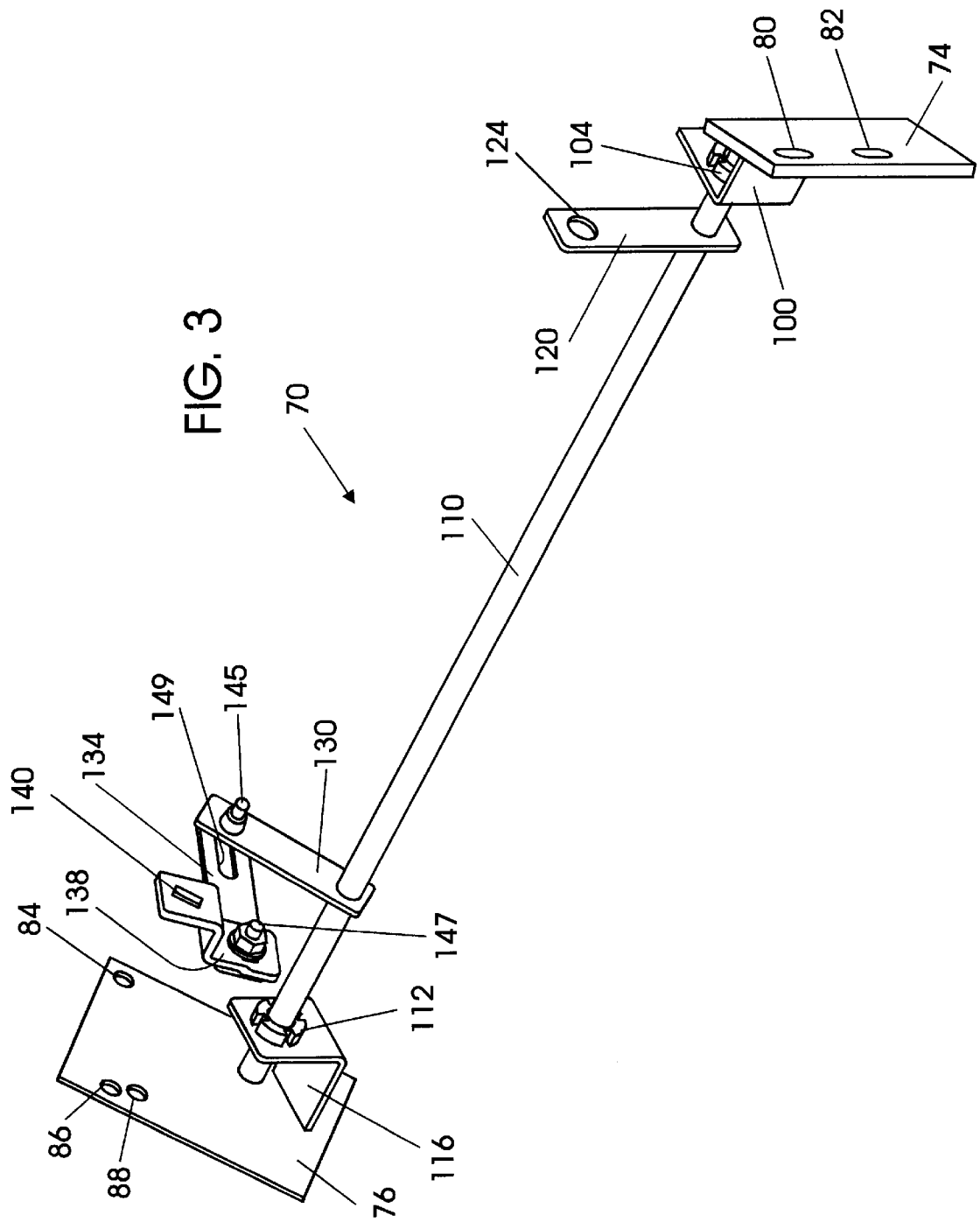

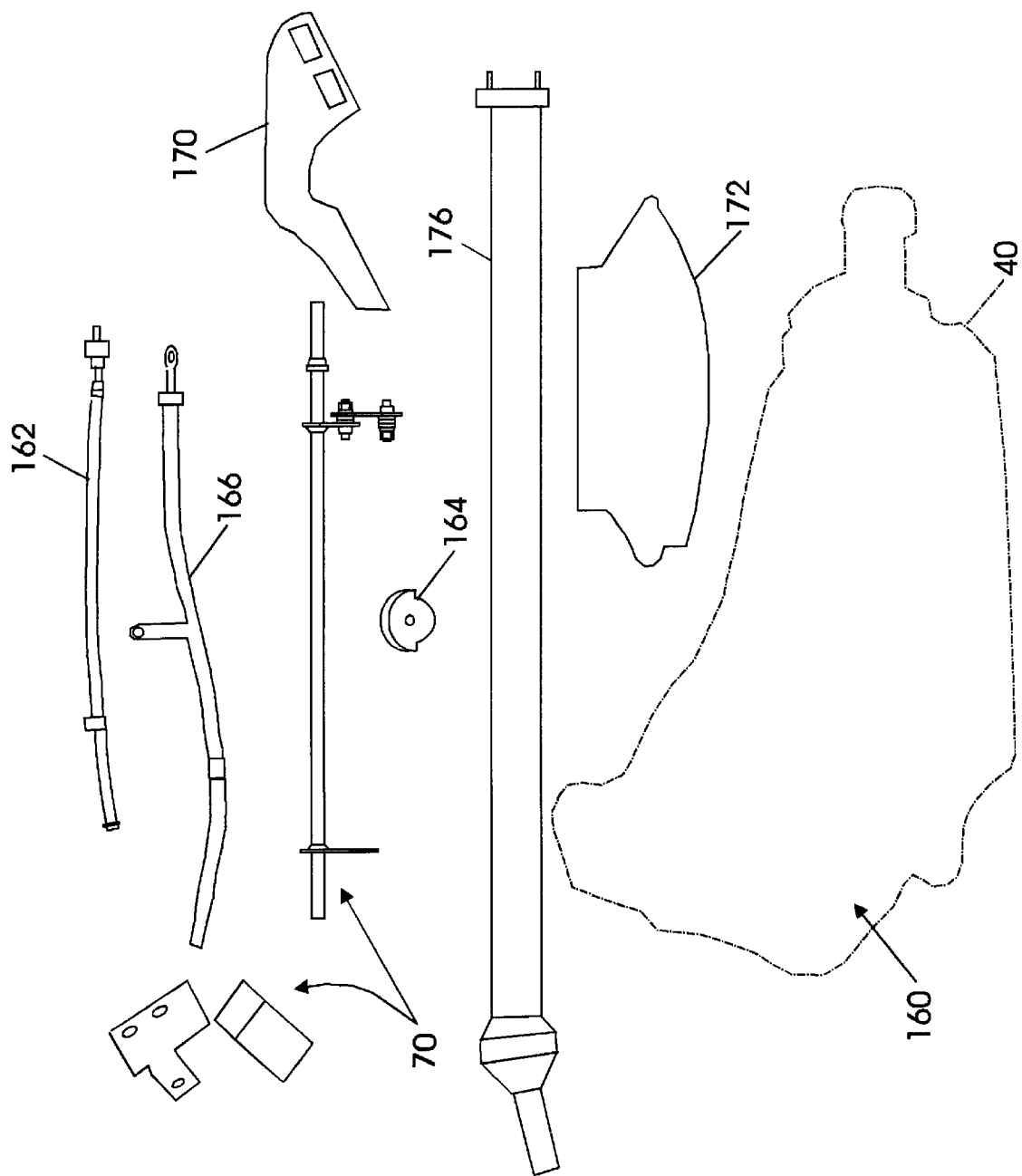

6,085,609

REPLACING TRANSMISSION OF RIGHT DRIVE VEHICLE WITH TRANSMISSION DESIGNED FOR LEFT DRIVE VEHICLE, AND ASSOCIATED CHANGE-OVER LINKAGE

FIELD OF THE INVENTION

The invention relates to vehicle transmissions, more particularly to the replacement of an inadequate original equipment transmission in a right hand drive vehicle with a more suitable transmission designed for a left hand drive vehicle, and to a change-over linkage for connecting the shift rod emanating from the driver's gear selector inside the vehicle to the shift lever on the replacement transmission.

BACKGROUND OF THE INVENTION

The transmissions of various types of motor vehicles often fail due to faulty maintenance, use in excessively demanding conditions, or a mere accumulation of high mileage. Such failed transmissions, if properly suited to the vehicle, are typically replaced with a repaired, rebuilt or new transmission of the same type.

In those situations where transmissions in a particular type of vehicle repeatedly fail at low mileage, it is often the case that the transmissions are not properly matched to the vehicle or to the demands of the driving conditions to which the vehicles are being subjected. A vexing example of this problem has been the excessive early failure rate of transmissions in many postal vehicles owing, in part, to a fundamental mismatch of transmission to vehicle and, in part, to the stop-and-go nature of the vehicle's use. More particularly, the United States Postal Service has experienced numerous and repeated transmission failures in its Grumman LLV-A postal vehicles. These vehicles have a long history of experiencing transmission failure at as little as nine to twenty four months into the vehicle's operating life. Rebuilt transmissions of the same design have been installed into these vehicles and appear to have an even shorter life, sometimes as little as several months. The cost to the United States Postal Service in attending to the repairs of these vehicles, accounting for vehicle down time and paying for rebuilt transmissions and installation, is an exceedingly important cost factor to the Postal Service.

SUMMARY OF THE INVENTION

According to the invention, in one particular embodiment, original equipment LLV-A transmissions are replaced with transmissions that have been proven to more closely match the needs of these vehicles when used on postal routes. One example of a replacement transmission is the General Motors 700R4 transmission which has now been proven to last significantly longer than the original vehicle transmission, with an apparent added benefit of an approximate ten-percent increase in fuel efficiency.

The replacement of an LLV-A postal vehicle transmission with a 700R4 transmission, or equivalent, is complicated by the fact that the LLV-A vehicle is a right hand drive vehicle having a gear selector mechanism that connects to a transmission adapted for a right hand drive vehicle. Replacing the LLV-A transmission with a transmission intended for a left hand drive vehicle presents a considerable challenge in linking the gear selector mechanism to the replacement transmission. More particularly, this linkage dilemma has proven an obstacle to the development of a repeatable, "assembly line" procedure for installing these replacement transmissions. Thus, in another aspect, the present invention provides a change-over linkage that permits an inadequate transmission in a right hand drive vehicle to be replaced with a more properly vehicle-matched transmission designed for a left hand drive vehicle.

In yet another aspect, the present invention may be defined as a kit including parts necessary to make a transmission replacement as described above.

In another aspect, the invention may be defined as an operational procedure for carrying out the transmission replacement using components contained in the kit.

BRIEF DESCRIPTION OF THE DRAWINGS

Some of the objects having been stated, other objects will appear as the description proceeds, when taken in connection with the accompanying drawings, in which

FIG. 2 is a view similar to FIG. 1 showing the right hand drive postal vehicle with an installed replacement transmission primarily designed for a left hand drive vehicle, and also showing the change-over linkage of the invention that connects the shift rod on the right side of the vehicle to the shift lever on the left side of the transmission.

FIG. 2A-1 is an enlarged view of the portion of FIG. 2 within the circle C.

FIG. 2A is an enlarged bottom view of portions of the replacement transmission and the change-over linkage of FIG. 2.

FIG. 3 is a pictorial view of the principal components of the change-over linkage illustrated in FIGS. 2, 2A and 2A-1.

FIG. 5 illustrates the primary components of a kit containing necessary parts for replacing the original equipment transmission of a right hand drive vehicle with a replacement transmission primarily adapted for a left hand drive vehicle.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
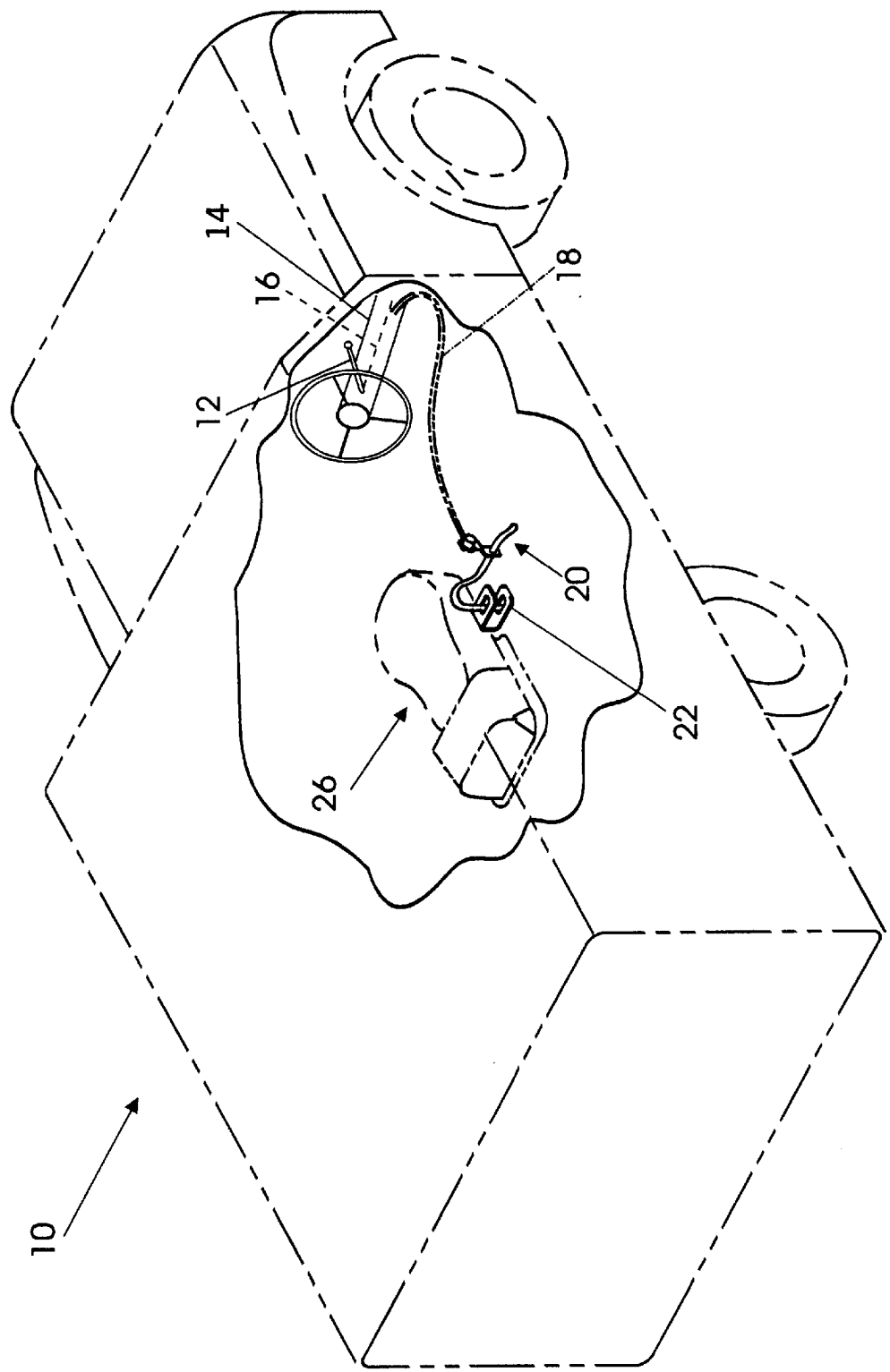
FIG. 1 is a pictorial view of a right hand drive postal vehicle (shown in phantom) with portions of the vehicle broken away to permit illustration of the original equipment transmission having a right side shift lever connected to the shift rod running from the driver's gear selector lever on the steering column inside the vehicle.
Figure 1A:
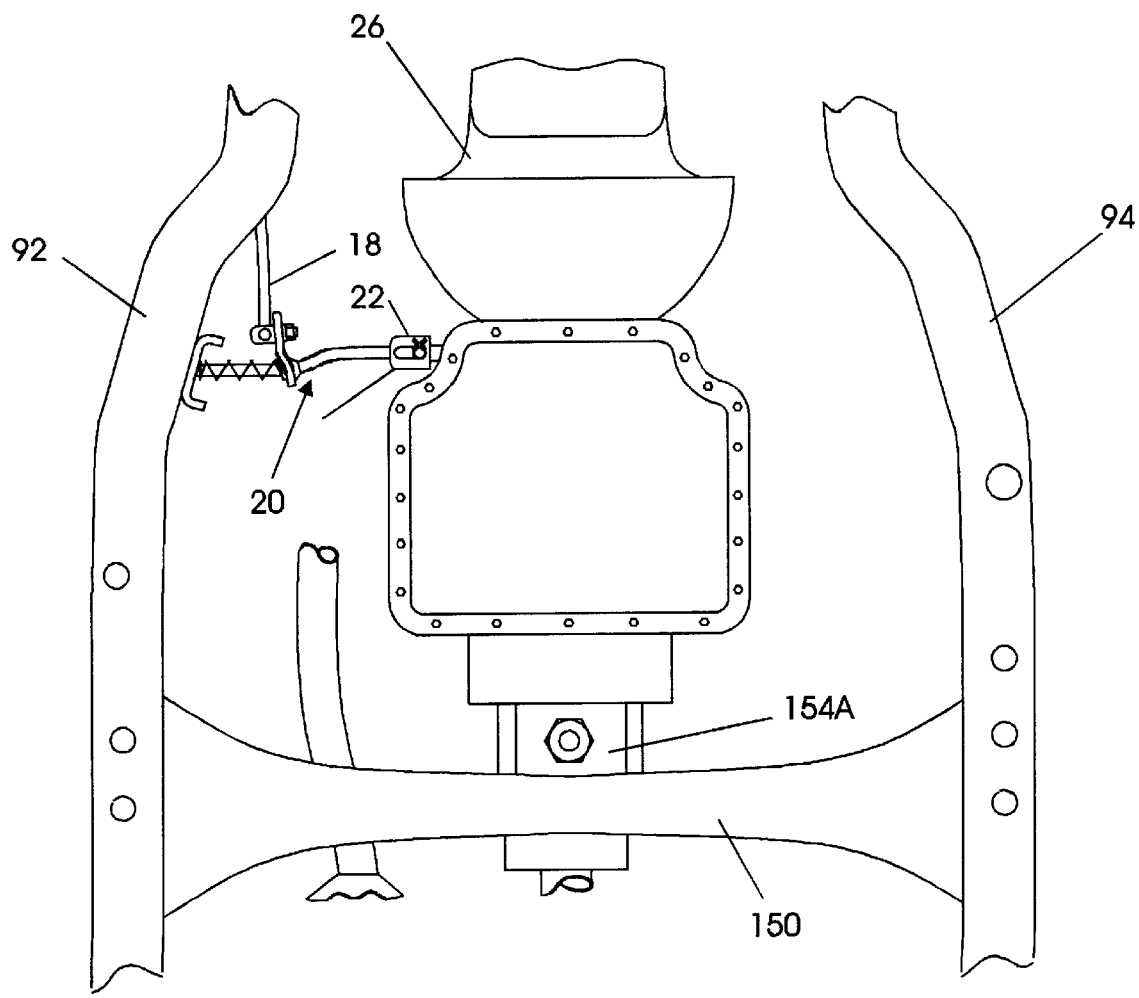
FIG. 1A is an enlarged bottom view of the vehicle of FIG. 1 showing portions of the transmission and the connection to the shift rod to the transmission's shift lever.

Referring to the drawings, and particularly to FIG. 1, there is shown in phantom a right hand drive Grumman LLV-A postal vehicle 10 of the type utilized for many years by the U.S. Postal Service. This right hand drive vehicle 10 has a driver's gear selector lever 12 mounted in customary fashion on the steering column 14. Lever 12 connects to a conventional shifting tube 16 that runs the length of the steering column. Shifting tube 16, in turn, connects to a manual shift rod that runs to mechanism 20 for shifting the manual shift lever 22 on the right side of original equipment transmission 26 (typically a Grumman 180C transmission). Details of these connections are shown in FIG. 1A. As mentioned above, the original equipment transmissions in these vehicles have had a long history of premature failures and, as importantly, these transmissions, when rebuilt and reinstalled, have an even shorter life.

Figure 2A:
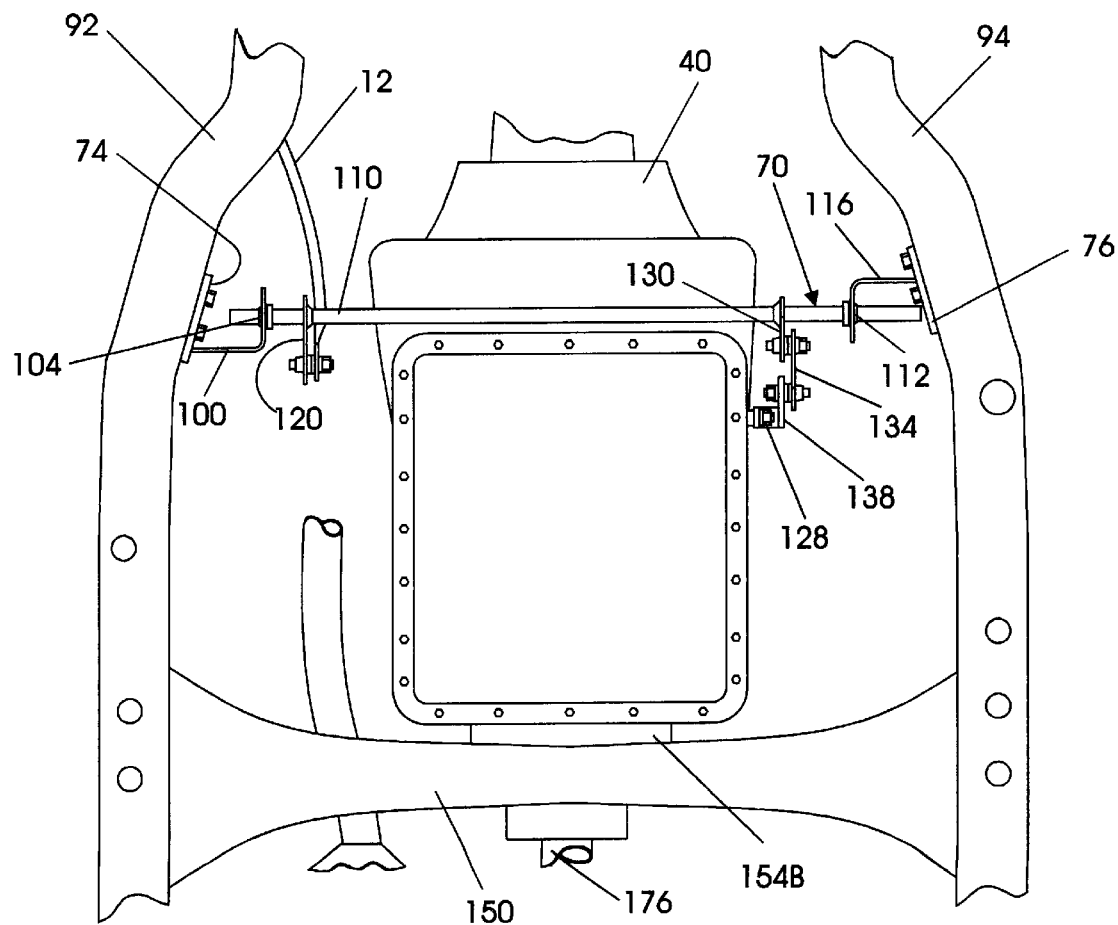
Figure 4:
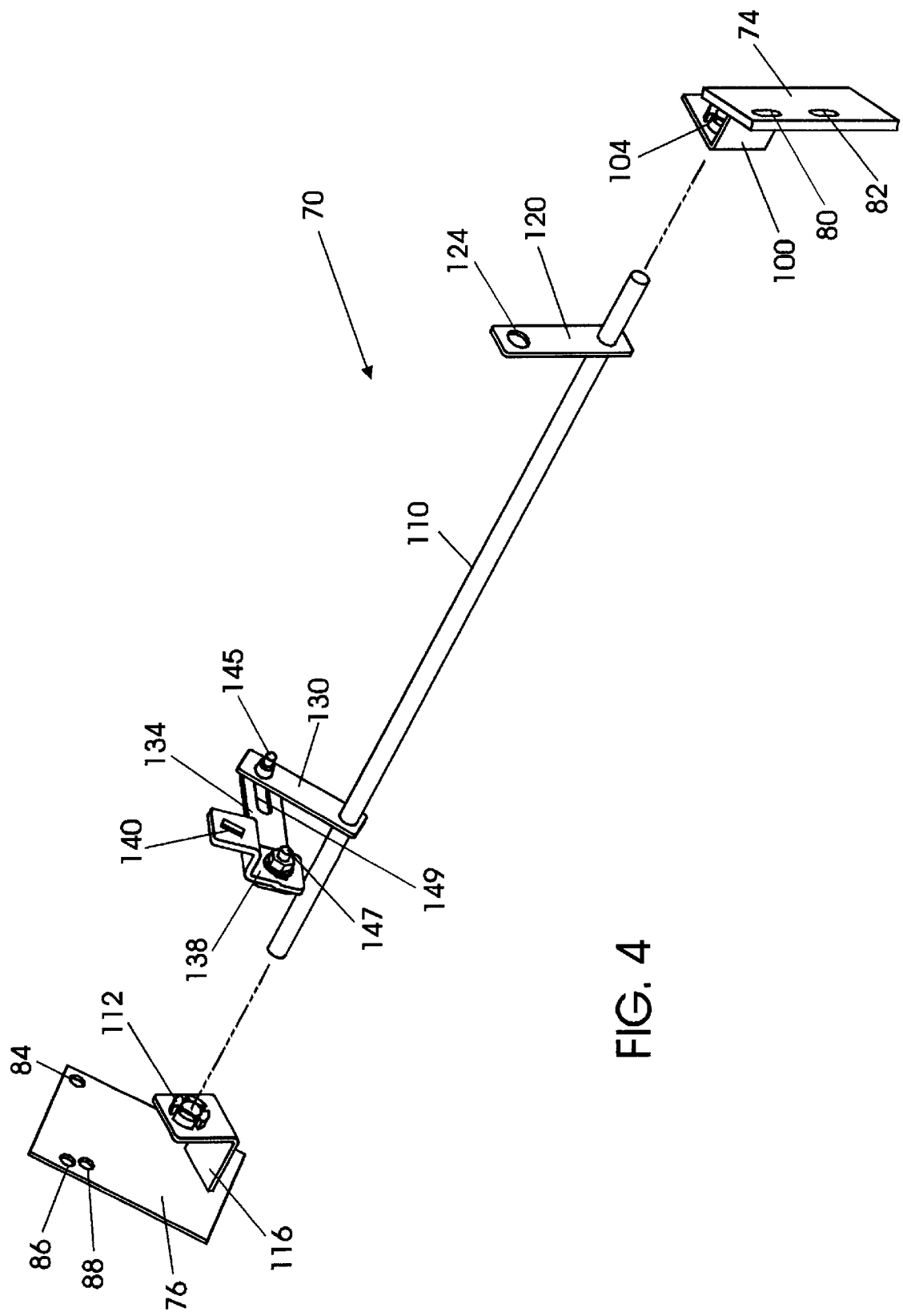
FIG. 4 is a view similar to FIG. 3 with portions of the change-over linkage exploded.

FIG. 2 is a view similar to FIG. 1 but showing the postal vehicle 10 after it has undergone replacement of the original equipment transmission with a replacement transmission more properly matched to the vehicle and its use, in this instance a General Motors 700R4 transmission 40. The GM 700R4 transmission 40, with minor mounting changes discussed below, fits ideally on the chassis of postal vehicle 10 because transmission 40 is designed for its principle use on the same chassis (a Chevrolet S-10 pickup chassis) as that used for postal vehicle 10. However, as mentioned above, the original equipment transmission 26 is designed for use with a right side drive vehicle, the replacement transmission 40 is designed for a standard U.S. left side drive vehicle. Therefore, the shift lever 128 of replacement transmission 40 is disposed on the left side of the transmission, remote from shift rod 18 that is on the right side of the vehicle. These components are operatively connected by the change-over linkage 70 that will now be described with primary reference to FIGS. 2A-1, 2A, 3 and 4. Linkage 70 includes first and second chassis attachment plates 74 and 76 having openings 80, 82 and 84, 86, 88 for securing the plates to mating openings in the vehicle chassis by suitable fasteners, preferably self-tapping bolts. In application of the invention to a Chevrolet S-10 chassis as described above, openings 80, 82 and 84, 86, 88 are sized and positioned to align with existing openings in the longitudinal frame members 92, 94, respectively, of the chassis.

Chassis attachment plate 74 is welded to an L-member 100 that includes a transverse opening and associated grommet 104 for receiving one end of a transversely mounted rod 110. The other end of rod 110 is supported by a grommet 112 in a transverse opening in L-member 116 that is secured to chassis attachment plate 76. Thus, the mentioned chassis attachment plates and L-members provide a mechanism for rotatably mounting an elongate rotatable member (rod 110) transversely spanning the vehicle underneath the replacement transmission, just ahead of the oil pan.

At the first end of rod 110, adjacent to plate 74 and L-member 100, is a first link 120 that is fixedly secured to rod 110. Link 120 includes an opening 124 that connects directly to shift rod 18 so that the driver's changing of gears through the gear selector lever in the driver's compartment may be mechanically transmitted to rod 110 as rotational movement of the rod.

A multicomponent assembly is mounted proximate the opposite end of rod 110 for connecting rod 110 to shift lever 128 of replacement transmission 40 in such a way that rotational movement of rod 110 serves to operate the shift lever. This assembly comprises a first component 130 that is fixedly secured to rod 110 by welding or the like, and respective pivotally connected links 134 and 138. Opening 140 in link 138 connects directly to shift lever 128. This three-part assembly may be adjusted in configuration by loosening and thereafter tightening the illustrated bolts 145, 147 so that it precisely affixes to shift lever 128 for a proper changing of gears in response to the driver's movement of the gear selector lever 12. More particularly, the spatial adjustment of the assembly is achieved by locating bolt 145 at the desired location in slot 149 in intermediate link 134 and by pivoting links 134, 138 as necessary about the pivot points defined at bolts 145, 147.

While certain features and advantages of the present invention have been described above, it will be appreciated that the present invention may be made available to the marketplace in the form of a kit containing necessary parts to replace the original equipment transmission of a right hand drive vehicle with a replacement transmission of different design, primarily adapted for a left hand drive vehicle. Referring to FIG. 5, such a kit may include:

a. replacement transmission 40 (for example, General Motors 700R4 transmission)

b. torque convertor 160 (not shown in detail)

c. universal cable 162 and associated cam 164 d. universal dipstick and tube 166 (for transmission fluid)

e. catalytic convertor bracket 170 f. dust cover 172 g. drive shaft 176 (shortened)

h. change-over linkage 70 i. self-tapping bolts (not shown in FIG. 5)

j. transmission cooler (as necessary—not shown in FIG. 5).

The following step-by-step procedure, readily understandable to one of skill in the art upon examination of this specification, is used to accomplish a transmission replacement of the type described above. This procedure, in certain details, directly relates to the replacement of a 180C transmission in a LLV-A (2.5 liter engine) Grumman postal vehicle with a General Motors 700R4 transmission:

1. As the first step in removal of the original equipment transmission 26, unhook the "TV cable" kick down linkage.
2. Pivot and drop the exhaust back to the muffler.
3. Drain the oil pan.
4. Remove the drive shaft.
5. Take out the torque convertor bolts.
6. Unhook transmission fluid cooler lines (as applicable).
7. Unplug the lock-up plug (wiring harness).
8. Take out cross member 150 (FIG. 1A) that supports the transmission.
9. Unhook the speedometer cable.
10. Completely unhook the vacuum arrangement and discard.
11. Remove bellhousing bolts.
12. Drop the original equipment transmission 26.
13. As the first step in installing the replacement transmission 40, the replacement transmission is mechanically raised into position.
14. Install bellhousing bolts (into the same position as with original equipment).
15. Install torque convertor bolts to connect the flywheel to the torque convertor 160.
16. Install the dust cover 172 over torque convertor 160.
17. Hook up lines to the external transmission fluid cooler (as applicable).
18. Hook up lines from the transmission cooler to the transmission (as applicable).
19. Install catalytic convertor bracket 170 to replace the original bracket due to the new geometry of the replacement transmission.
20. Cut approximately two inches off the mounting tab of the frame cross member 150 in order to provide needed clearance for removal of the oil pan after the transmission replacement. See the full length of tab 154A in the original equipment view of FIG. 1A and the reduced length tab 154B in the view of FIG. 2A.

21. Install the frame cross member 150 to both sides 92, 94 of the frame to provide support for the rear of the transmission and secure the cross member to the transmission mounts.
22. Install change-over linkage 70 as described above and adjust the three-part linkage. Note: Holes 84, 86 are used in connection with a 2.5 liter engine replacement and holes 84, 88 are used for a 2.2 liter replacement when connecting left chassis attachment plate 76 to left frame member 94 of the chassis.
23. Reinstall the exhaust system, including hooking the catalytic convertor to its bracket, etc.
24. Reinstall original speedometer cable.
25. Plug in the wiring harness.
26. Install modified (shortened) drive shaft 176. (The drive shaft is shortened due to the increased length of the replacement transmission.)
27. Lower the vehicle and reinstall the "TV cable", utilizing the universal cable 162 and associated cam 164 that fits on the end of the cable. This assembly hooks to the accelerator and to the throttle of the fuel injector intake to control the shift points for the transmission.
28. Add transmission fluid and any other necessary fluids.

While the invention has been described in connection with certain illustrated embodiments, it will be appreciated that modifications may be made without departing from the true spirit and scope of the invention.

That which is claimed is:

1. A change-over linkage in combination with a replacement transmission installed in a right hand drive vehicle wherein the original transmission with a right side shift lever is replaced with a replacement transmission with a left side shift lever, said change-over linkage serving to transfer gear selection information emanating from the driver's gear selector lever across the vehicle from the right side to the shift lever located on the left side of the replacement transmission and comprising:
   an elongate member transversely spanning the replacement transmission, said elongate member having first and second ends that are rotatably supported;
   means proximate the first end of said elongate member connecting the gear selection mechanism of the vehicle to said elongate member for imparting rotational movement to the member in response to the driver's selection of gear; and
   means proximate the second end of said elongate member for connecting the elongate member to the shift lever of the replacement transmission and thereby converting rotational movement of the elongate member to movement operating the shift lever of the replacement transmission.

2. The combination of claim 1 wherein said means proximate the second end of said elongate member comprises a multicomponent assembly proximate the left end of said elongate member connecting the elongate member to the shift lever of the replacement transmission, said multicomponent assembly comprising a first component projecting from said elongate member and at least one additional link pivotally connected to the first component, said at least one additional link attaching to the shift lever to convert rotational movement of the elongate member to movement operating the shift lever and providing spatial adjustment between the first component and the shift lever.

3. The combination of claim 2 wherein said multicomponent assembly comprises three components, a first component that projects from and rotates with said elongate member, a second component comprising an intermediate link pivotally connected to the first component and a third component comprising a link pivotally connected to the intermediate link.

4. The combination of claim 1 wherein said change-over linkage includes right and left rod support members secured to the right and left sides, respectively, of the vehicle chassis.

5. A change-over linkage for use in a transmission replacement operation for a right hand drive vehicle wherein the original transmission having a right side shift lever is replaced with a replacement transmission having a left side shift lever, said change-over linkage serving to transversely span the replacement transmission and operatively connect the right side gear selection mechanism of the vehicle to the left side shift lever on the replacement transmission, said change-over linkage comprising:
   a right side support member;
   a left side support member;
   an elongate member supported for rotational movement at its right and left ends, respectively, by said right and left support members;
   means proximate the right end of said elongate member for connecting the gear selection mechanism of the vehicle to the elongate member for imparting rotational movement to the elongate member in response to the driver's selection of gear; and
   a multicomponent assembly proximate the left end of said elongate member for connecting the elongate member to the shift lever of the replacement transmission, said multicomponent assembly comprising a first component projecting from said elongate member and at least one additional link pivotally connected to the first component, said at least one additional link attaching to the shift lever to convert rotational movement of the elongate member to movement operating the shift lever.

6. The change-over linkage of claim 5 wherein said multicomponent assembly comprises three components, a first component that projects from and rotates with said elongate member, a second component comprising an intermediate link pivotally connected to the first component and a third component comprising a link pivotally connected to the intermediate link.

7. A kit for use in replacing the transmission of a right hand drive vehicle that has a right side gear selection mechanism and a right side shift lever on the transmission with a replacement transmission having a left side shift lever, said kit comprising:
   a replacement transmission with left side shift lever and associated torque convertor;
   a drive shaft having the correct length to accommodate the dimensions of the replacement transmission when installed; and
   a change-over linkage comprising
      a right side support member;
      a left side support member;
      an elongate member supported for rotational movement at its right and left ends, respectively, by said right and left support members;
      means proximate the right end of said elongate member for connecting the gear selection mechanism of the vehicle to the elongate member for imparting rotational movement to the elongate member in response to the driver's selection of gear; and a multicomponent assembly proximate the left end of said elongate member for connecting the elongate member to the shift lever of the replacement transmission, said multicomponent assembly comprising a first component projecting from said rotational member and at least one additional link pivotally connected to the first component, said at least one additional link attaching to the shift lever to convert rotational movement of the elongate member to movement operating the shift lever.

8. The kit of claim 7 further including a dust cover, a catalytic convertor bracket and a transmission fluid dipstick.

9. The kit of claim 8 further including a cable and associated connector for hooking to the accelerator and the throttle of the fuel injector intake of the vehicle to control the shift points for the transmission.

10. The kit of claim 7 wherein the multicomponent assembly of said change-over linkage comprises three components, a first component that projects from and rotates with said elongate member, a second component comprising an intermediate link pivotally connected to the first component and a third component comprising a link pivotally connected to the intermediate link.

11. A method for replacing the transmission of a right hand drive vehicle that has a right side gear selection mechanism and a right side shift lever on the transmission with a replacement transmission having a left side shift lever, said method comprising the steps of:

removing the original transmission and original drive shaft from a right hand drive vehicle having a right side gear selection mechanism;

raising a replacement transmission with left side shift lever, and associated torque convertor, into position;

connecting the torque convertor to the flywheel of the vehicle;

securing the replacement transmission in place on the vehicle chassis;

installing a right-to-left change-over linkage operatively connecting the right side gear selection mechanism of the vehicle to the left side shift lever on the replacement transmission; and installing a drive shaft having the correct length to accommodate the dimensions of the replacement transmission.

12. The method of claim 11 wherein the step of installing the change-over linkage comprises rotatably mounting an elongate member having right and left ends so that the member transversely spans the replacement transmission, connecting the right end of the elongate member to the gear selection mechanism of the vehicle and connecting the left end of the elongate member to the shift lever of the replacement transmission.

* * * * *